United States Patent Office 3,629,459
Patented Dec. 21, 1971

3,629,459
N-(3,4-DICHLOROPHENYL)-3-(N'-3,4-DICHLOROPHENYL)CARBAMOYL METHYL-2,2-DIMETHYLCYCLOBUTANECARBOXAMIDE CHEMOSTERILANT
Theodore Largman, Morristown, N.J., and Peter Edward Newallis, Jackson, Kans., assignors to Allied Chemical Corporation, New York, N.Y.
No Drawing. Continuation-in-part of application Ser. No. 745,664, July 18, 1968. This application Dec. 3, 1969, Ser. No. 881,920
Int. Cl. A01n 9/20
U.S. Cl. 424—324
4 Claims

ABSTRACT OF THE DISCLOSURE

N-(3,4-dichlorophenyl) - 3 - [N'-3,4-dichlorophenyl)carbamoyl]methyl - 2,2 - dimethylcyclobutanecarboxamide is prepared by reaction of 3,4-dichloroaniline with pinic acid chloride in the presence of base. The product is useful as a chemosterilant for insects, birds, and mammals.

This is a continuation-in-part application of Ser. No. 745,664, filed July 18, 1968, now Pat. No. 3,578,711.

BACKGROUND OF THE INVENTION

This invention relates to a new cyclobutanecarboxamide and in particular to N-(3,4-dichlorophenyl)-3-[N'(3,4-dichlorophenyl)carbamoyl]methyl - 2,2 - dimethylcyclobutanecarboxamide. This novel compound is useful as a chemosterilant for insects, birds, and mammals.

The control of insect, bird and mammalian pest populations is often desirable and necessary for sanitary or food production reasons. The most common method for controlling such pests is by the use of compounds poisonous to the pest, e.g., insecticides, avicides and rodenticides. For some applications, it is desirable that the pesticide be chemically stable and have extended residual activity; for other applications, it is desirable that its toxic life be short. Of course, where the pesticide is to be applied to the foliage or roots of plants or to soil in which plants are growing, it must be nonphytotoxic—at least at the applied dosage level.

Another way to control pests that has a greater potential than the use of fatal poisons is to sterilize such pests so that they cannot reproduce.

The use of the sterility principle among one or both sexes of the species for pest control is relatively new and was first successfully employed in the eradication of the screwworm fly (*Cochliomyia hominivorax*) (Coquerel) on the island of Curacao and in the southeastern part of the United States. This method of pest control possesses vast advantages over simple kill procedures, since at least some of any beneficial effect that the pest imparts to its natural environment is preserved. Moreover, sterile pests compete with normal pests in mating which, in effect, further decreases the possibility for population growth.

Known techniques employing the sterilization principle, however, possess various inherent disadvantages. In the aforementioned eradication of the screwworm fly, male members of the species were sterilized by exposure to gamma-radiation followed by release of the sterilized males into the area wherein insect reproduction was to be controlled. This irradiation technique possesses obvious limitations. It requires the mass release of sterilized insects which often may be undesirable or even impossible. It requires a rather expensive, uniquely designed radiation facility with specialized equipment to rear, transport and irradiate a particular pest and it also demands means of dispensing them after sterilization. In many cases, the irradiation technique of effecting sterilization drastically reduces the sexual competitiveness of the pest or even kills it.

On the other hand, many currently commercially available chemosterilants must be administered only to pests at particular stages in their development, especially in the case of insects. Thus, for example, in order to secure a significant decrease of insect population, use of these chemosterilants requires treating newly emerged adult insects with the chemosterilant incorporated in dry feeds immediately prior to their release into their natural environment.

Additionally, certain chemosterilants have the disadvantage of being effective only against the female of the pest species. It is highly desirable to sterilize males since they in effect transmit or spread their sterility among the female population. A female that has mated with a sterile male will frequently not mate again. For this reason, it is better to sterilize a male pest than to kill it. An agent that sterilizes females only, on the other hand, cannot take advantage of this effect since females do not transmit their sterility. Fertile males will ordinarily mate with as many females, both sterile and fertile, as are available. Of course, an agent that sterilizes both sexes is especially desirable.

SUMMARY OF THE INVENTION

The novel compound of the instant invention is N-(3,4-dichlorophenyl) - 3 - [N'-(3,4-dichlorophenyl)carbamoyl]methyl-2,2-dimethylcyclobutane carboxamide which has the formula:

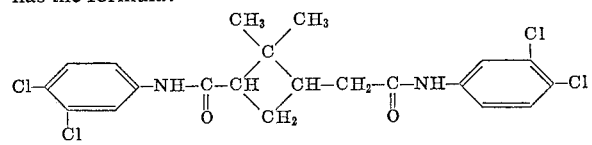

This compound is readily prepared by the reaction of 3,4-dichloroaniline with pinic acid chloride in the presence of base.

When administered to insects, birds or mammals, this compound effectively sterilizes both sexes.

DETAILED DESCRIPTION OF THE INVENTION

Preparation of the novel compound of the instant invention is readily achieved in accordance with the following reaction:

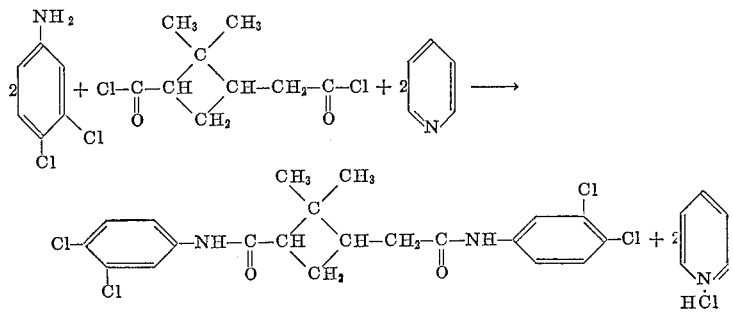

One molecule of 3-chloroformyl-2,2-dimethylcyclobutaneacetyl chloride (pinic acid chloride) is condensed with two molecules of 3,4-dichloroaniline. Two equivalents of pyridine are present to react with the hydrogen chloride that is liberated in the course of the condensation. Other bases that can suitably be used in place of pyridine include most tertiary amines such as triethylamine. Preferred bases such as pyridine or tertiary alkyl amines form a hydrochloride salt that is insoluble in the reaction medium thereby facilitating isolation of the product. The condensation reaction will not go in an acidic medium.

The reaction may be carried out in any common water-immiscible organic solvent that is inert to the reactants such as benzene, chloroform, toluene, $C_5$ to $C_{10}$ alkanes or cycloalkanes, ether, or carbon tetrachloride. Approximately stoichiometric amounts of the reactants are used, i.e., 2 mols of dichloroaniline per mol of pinic acid chloride. However, an excess of one of the reactants does no harm.

Inasmuch as it has been found necessary to remove substantially all the hydrogen chloride from the reaction medium to permit effective condensation, at least a twofold molar excess of base should be present with respect to the theoretical amount of product to be formed, i.e., at least one mol of base per mol of HCl evolved. Preferably, a slight excess of base will be present to facilitate the reaction. Normally, the 3,4-dichloroaniline and the base are dissolved in the solvent with stirring and then the pinic acid chloride is added. The reaction is conveniently conducted at ambient temperatures, preferably 20°–30° C., and at atmospheric pressure. Higher pressures or temperatures are useable but are not preferred. After stirring the reaction mixture for from about 0.5 hour to 2 hours, the precipitated salt formed by reaction of the base with HCl is removed by filtration or decantation. The filtrate is then washed with dilute hydrochloric acid and water to remove any excess base. The organic reaction solvent can then be evaporated to leave the product as a solid residue, which can be purified by recrystallization from a solvent such as alcohol.

This product is a solid at room temperature. It is soluble in most organic solvents and is essentially insoluble in water.

Pinic acid chloride, a well-known compound, is prepared by reacting pinic acid with thionyl chloride or phosphorous pentachloride in a manner well-known to those skilled in the art. Pinic acid, which is commercially available, can be prepared by oxidizing α-pinene with permanganate as described in Paul Karrer, Organic Chemistry, p. 681, Elsevier Publishing Company (New York), 1946. The coreactant, 3,4-dichloroaniline, is also commercially available.

Pests that may suitably be controlled by use of the compound of the instant invention include flies, including Tsetse flies and screwworm flies; corn-borers, bollweevils, mosquitoes, pigeons, guela bird (Sudan dioch) (red-billed guelea), oriental rice bird (Java sparrow) (Padda orizivora), mouse, brown rat, and vampire bat.

It is most convenient to administer the instant compound to the pest in a feed-bait composition that the pest will ingest. The amount of active ingredient to be administered is determined upon consideration of factors such as pest type, i.e., insect, bird or mammal, pest fecumdative capabilities, climatic conditions, concentration of pest population, and the feeding habits of the pest and of contiguous nonpest species. Generally speaking, concentrations of chemosterilant in the range of from about 0.1 to 5.0 percent by weight, preferably 0.5 to 2.0 percent by weight, based on the amount of feed employed, have been found to impart effective sterilization to the pest population sought to be controlled. The concentration of the chemosterilant used should be sufficient to effect sterilization to a significant degree and not so great as to cause a significant number of deaths. Thus, the concentration utilized should not cause a pest mortality rate of greater than about 20 percent. For example, in the control of insects such as the common housefly (Musca domestica), concentrations below 0.1% did not secure effective sterilization, whereas concentrations in excess of 0.25% caused a high mortality rate. With bird of mammal pests, concentration levels of approximately 1.0% produce sterility but do not cause mortality. As previously mentioned, the various factors such as the species to be controlled, environment, biological resistance and activity affect the concentration range of chemosterilant necessary to obtain irreversible sterilization by a simple and economical method. Also, the effect of the instant compound is cumulative, so that assimilation of small doses over an extended time can effect sterilization.

Generally speaking, the feed-bait employed is a substance to which the insect, bird or mammal is attracted. Any substance may be employed provided its properties present a desirable substance which the pest consumes. The feed-bait may comprise, for example, nonfat dry milk, granulated sugar, powdered eggs, malt, molasses, yeast, soybean or peanut butter or other feeding sources or combinations thereof having the chemosterilant incorporated into such feed-bait. The physical form of such feed is not critical and it may be introduced into the pest environment in solution or solid form. In the case of a feed-bait solution, an aqueous solution may be introduced into the environment by conventional means such as spraying or in solid form such as a dust or granulated substance. The solution feed method should comprise an alluring substance, although not necessarily of nutritious value, and the solvent should be free of any significant toxic properties. The solid feed-bait procedure utilizes an alluring substance that is coated or impregnated with the chemosterilant. Such a solid feed-bait carrier may readily be prepared by substantially homogeneously dispersing the solid feed in a solution of the chemosterilant in a suitable solvent such as acetone, methanol, etc. The solvent is then removed by evaporation with the impregnated feed carrier remaining behind. For application as a dust or as granules, the treated feed-bait is first pulverized by suitable conventional means.

N - (3,4 - dichlorophenyl)-3-[N'-(3,4-dichlorophenyl)-carbamoyl]methyl - 2,2-dimethylcyclobutanecarboxamide has been found to be a particularly effective insect chemosterilant, thereby rendering it an especially useful agent for the control of insects. When used for these purposes, it can be used alone or in conjunction with other insect control agents, including insecticides such as DDT, methoxychlor, and/or other chemosterilants such as methotrexate or with insect sex attractants such as methyl eugenol.

The invention can be more fully understood by reference to the following examples. All parts are parts by weight unless otherwise expressly noted.

EXAMPLE 1

To a solution of 8.0 grams (0.049 mol) of 3,4-dichloroaniline in 50 ml. of benzene was added 3.96 grams (0.05 mol) of pyridine. The solution was stirred slowly and then 5.0 grams (0.0224 mol) of 3-chloroformyl-2,2-dimethylcyclobutaneacetyl chloride was slowly added. After stirring the mixture of an additional 30 minutes, the precipitated pyridine hydrochloride was removed by filtration and the resulting filtrate was washed with dilute hydrochloric acid and then with water. The resulting filtrate was evaporated to dryness by flash distillation to afford N-(3,4-dichlorophenyl)-3-[N'-(3,4-dichlorophenyl) carbamoyl]methyl - 2,2-dimethylcyclobutanecarboxamide as a solid residue; 10.3 grams (97%); softening point 81° C. The infrared absorption spectrum showed bands at 1670 cm.$^{-1}$ (amide) and 1530 cm.$^{-1}$ (—NH).

*Analysis.*—Calculated for $C_{21}H_{20}N_2O_2Cl_4$. Theory (percent): N, 5.9. Found (percent): N, 5.64.

EXAMPLE 2

Nonsystemic test for house fly adults

Dry food (6 parts powdered nonfat dry milk, 6 parts granulated sugar and 1 part powdered egg) was treated with an acetone solution of the instant compound. The solution was added to the dry food and the resulting mixture was allowed to dry and was then repulverized. The treated food was placed in emergence cages containing about 50 fly pupae. Cages containing untreated food were used as checks. Examination of each cage was made periodically to determine emergence, conditions of flies, and acute toxicity. Generally seven to nine days after the start of the test oviposition medium was placed in each cage, and on the following day, the medium was examined for eggs: if none were present, the medium was moistened and examined daily until oviposition occurred or until all adults were dead. Egg viability was determined by inspecting the medium for growing larvae two to three days after oviposition. The results of the tests are presented in the following table.

| Percent active ingredient in bait | No. of flies | Percent 7-8-day kill | Eggs laid |
|---|---|---|---|
| 1.0 | 47 | 29.8 | None. |
| 0.5 | 49 | 34.7 | Do. |
| 0.25 | 50 | 26.0 | Do. |

EXAMPLE 3

Anti-fertility test

Male and female flies were allowed to feed separately for five days on food treated with the compound of the present invention at a concentration of 0.1% in dry bait. After five days, the flies were mated and held on check bait for two days. Oviposition medium was supplied at the end of two days, and the eggs were collected overnight and were counted the next day. The flies were then held at check bait for four days. At the end of the four days, fresh oviposition medium was again supplied, and the eggs were collected and counted. The results are presented in the following table.

|  | No. eggs first oviposition medium | Percent hatch | No. eggs second oviposition medium | Percent hatch |
|---|---|---|---|---|
| Treated males; untreated females | 170 | None | 285 | 25 |
| Untreated males; treated females | None | | 90 | 90-100 |
| Untreated males; untreated females | 240 | 90-100 | 225 | 90-100 |

These results show that the instant compound has substantial anti-fertility activity against flies of both sexes; however, the anti-fertility activity is reduced considerably when the flies are transferred from treated bait and allowed to feed on untreated bait for six days.

EXAMPLE 4

Follow-up anti-fertility test

The procedure of Example 3 was repeated, wherein adult flies were segregated by sex and were fed on 0.25% treated bait for five days. The treated flies were then mated with untreated flies and exposed to untreated food for eight days. Oviposition medium was supplied to the cages seven days after the flies were exposed to untreated food and the eggs were collected on the eighth day. The results of the test are listed in the following table.

|  | No. eggs | Percent hatch |
|---|---|---|
| Treated male, untreated female | 300 | 16 |
| Untreated male, treated female | 160 | 100 |
| Untreated male, untreated female | 520 | 100 |

The results show that treated females, which had not previously produced, laid some viable eggs after eight days on untreated food. Low male fertility did not change in this period.

EXAMPLE 5

Thirty female and six male laboratory albino mice were used to test the sterilizing effect of the compound on mammals. N - (3,4 - dichlorophenyl) - 3 - [N' - (3,4-dichlorophenyl)carbamoyl] - methyl - 2,2 - dimethylcyclobutanecarboxamide was added to ground Lab Blox (comprised of cereal grains, mainly alfalfa) at a dosage level of 0.1 weight percent. The females were housed in platic cages in five groups of six mice each. Three of the groups received the compound containing test food and the remaining two groups were given only untreated Lab Blox. One male mouse was placed in each cage of females on a daily rotating basis for a period of two weeks. On the basis of average food consumption, this is equivalent to each mouse consuming approximately 500 mg. of compound per kg. of body weight. At the end of the fifth week all the animals on the test diet that had not delivered were autopsied.

Of the eighteen animals that received the test diet, eight delivered normal pups, five upon autopsy, were found not to have been pregnant and the remaining five females had fetuses in situ. These fetuses were small, ranged from three to nine sites and showed signs of resorption.

Each of the twelve control animals delivered a normal size litter between the fourth and fifth week of observation.

We claim:
1. A chemosterilant feed-bait composition for mice and flies comprising from about 0.1 to 1.0 weight percent of N - (3,4 - dichlorophenyl) - 3 - methyl - 2,2 - dimethylcyclobutanecarboxamide and a feed-bait carrier.
2. The method of controlling flies which comprises feeding to said flies a nontoxic sterilizing amount of N - (3,4 - dichlorophenyl) - 3 - methyl - 2,2 - dimethylcyclobutanecarboxamide.
3. The method of claim 2, wherein said carboxamide is administered in a feed-bait composition containing from about 0.1 to 1.0 weight percent of N - (3,4 - dichlorophenyl)-3-methyl-2,2-dimethylcyclobutanecarboxamide.
4. The method of controlling mice which comprises feeding to said mice a nontoxic sterilizing amount of N - (3,4 - dichlorophenyl) - 3 - methyl - 2,2 - dimethylcyclobutanecarboxamide.

References Cited

Borkovec: Insect Chemosterilants, pp. 61–63, Interscience Publishers, N.Y., 1966.

ALBERT T. MEYERS, Primary Examiner

D. J. FUNDERBURK, Assistant Examiner

U.S. Cl. X.R.

424—16, 84, DIG 12